Nov. 5, 1946.　　　V. W. GIDEON　　　2,410,494
TOOL BIT FIXTURE
Filed Jan. 21, 1944　　　3 Sheets-Sheet 1

Inventor
Victor W. Gideon
BY
Attorneys.

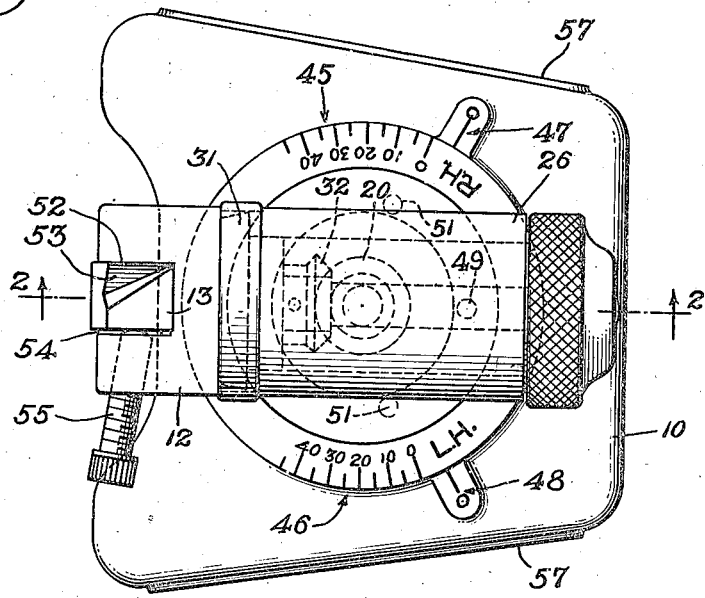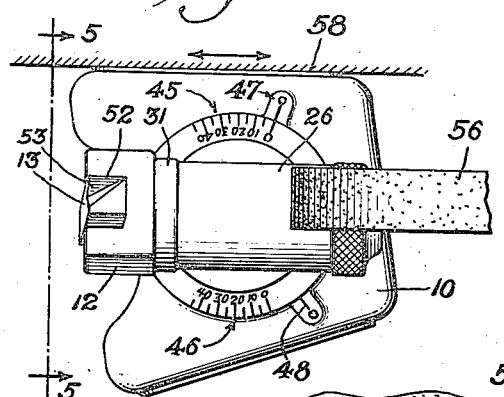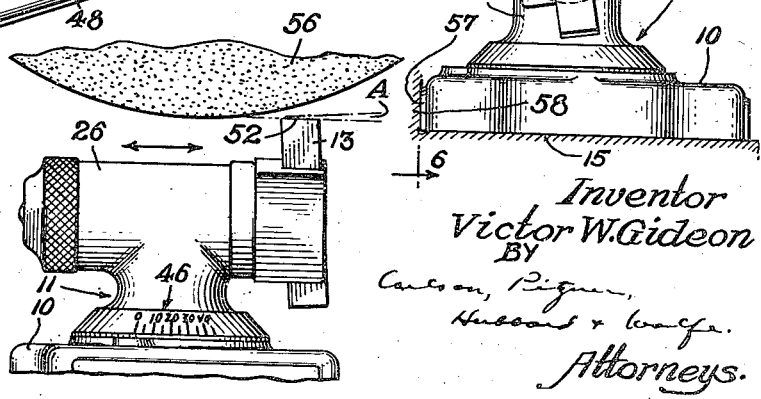

Nov. 5, 1946.  V. W. GIDEON  2,410,494
TOOL BIT FIXTURE
Filed Jan. 21, 1944  3 Sheets-Sheet 3

Inventor
Victor W. Gideon
By
Carlson, Pierce, Hubbard & Wolfe
Attorneys.

Patented Nov. 5, 1946

2,410,494

UNITED STATES PATENT OFFICE 2,410,494

TOOL BIT FIXTURE

Victor W. Gideon, Chicago, Ill., assignor to Boyar-Schultz Corporation, Chicago, Ill., a corporation of Illinois Application January 21, 1944, Serial No. 519,164

2 Claims. (Cl. 51—220)

1

The invention relates to a tool bit fixture and more particularly to a fixture for supporting a tool bit while it is being ground or resharpened.

Generally stated, an object of the invention is to provide a fixture of this nature which is so simple in its operation that little skill is required in the use thereof and which supports the tool bit for engagement by a grinding wheel in any of the several positions necessary to sharpen it properly with such accuracy that a desired contour may be developed on the tool bit or an original contour readily restored.

Another object of the invention is to provide a fixture of this character which embodies means for supporting a tool bit to be sharpened in any of several positions for engagement by a grinding wheel and which, during the shifting of the tool bit from one to another of such positions, maintains a critical relation between the cutting edge of the tool bit and a fixed reference point such as the plane of the grinding machine table or the cutting plane of the grinding wheel.

More specifically stated, another object of the invention is to provide a fixture for supporting a tool bit while it is being sharpened by a grinding operation which embodies means for accurately presenting one face of the tool bit for engagement by the grinding wheel to grind said face to a predetermined angle and for thereafter shifting the tool bit to a predetermined angular position wherein the tool may be properly presented to the grinding wheel for producing a groove of required angularity in the surface first ground.

Other objects and advantages will become apparent from the following description and in the accompanying drawings, in which Figure 1 illustrates in front elevation a tool fixture embodying the features of the invention.

Fig. 3 is a plan view of the fixture shown in Fig. 1.

Figs. 4, 5 and 6 are somewhat diagrammatical views on a reduced scale illustrating the relationship between a grinding wheel and a tool bit supported by the fixture during the first grinding operation, these views being respectively a top plan, a front elevation and a side elevation.

Fig. 10 is a plan view similar to Fig. 7, which

Figure 1:
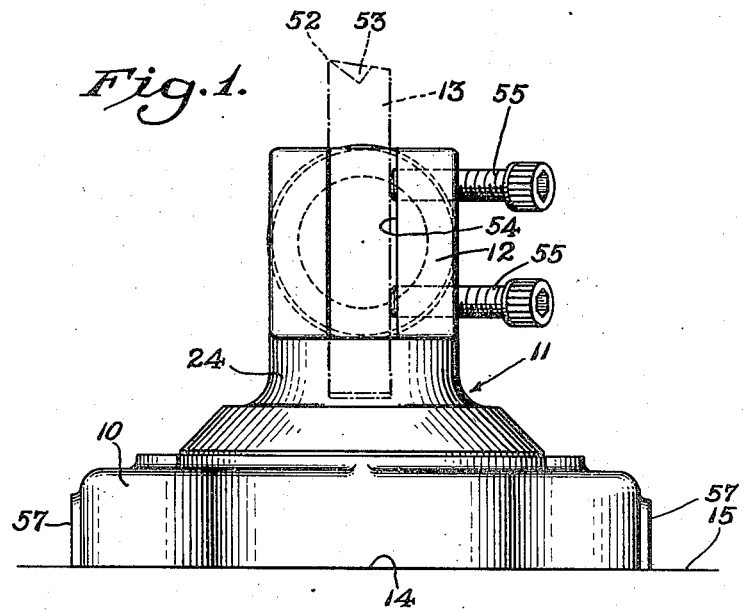

2 illustrates the fixture and the tool supported thereby in a modified position.

Referring to the drawings, wherein a preferred form of structure embodying the invention is shown for illustrative purposes, the fixture assembly in its general organization includes a base 10 having a body generally designated 11 supported thereon for relative rotation about a vertical axis. The body supports a tool bit head 12 for rotational movement relative to the body about a horizontal axis and in the present instance intermediate mechanism is provided for effecting such movement of the head about a horizontal axis as an incident to rotational adjustment of the body 11 about its vertical axis.

The base 10 is a substantially flat casting having a lower surface 14 finished to rest flat on the upper surface of a reciprocable carriage or table 15 of a surface grinder. The base has a cylindrical stud 16 upstanding from a central portion thereof provided with a concentric vertical bore 17 opening into a counterbored recess 18 in the lower face of the base. The axes of the bore 17 and the stud 16 are perpendicular to the finished surface 14 on the base. The bore 17 receives the stem 19 of a bevel gear 20 provided with a hub 21 which is rigidly held against the upper end face of the stud 16 in any suitable manner, as by a nut 22 screw-threadedly engaging the lower end of the stem 19 within the counterbore 18. Such means as a taper pin 23 extending thru the stud and stem maintains the gear 20 against rotational displacement.

The body 11 has a lower standard portion 24 provided with a bore 25 to snugly receive the stud 16. The upper portion 26 of the body is elongated in a horizontal direction and has a longitudinal bore 27 therein to receive the means by which the tool head 12 is supported. Thus, the tool head (which in this instance is in the form of a rectangular or square block) has a stem or shaft 28 extending centrally from one face thereof to pass through the bore 27. Bearing means for the shaft is provided adjacent to the head 12 by such means as a circular enlargement 29 arranged to abut against the associated end face of the body portion 26 and a second smaller enlargement 30 rotatably engaging the internal surface of the bore 27. A suitable dust or dirt seal 31 in the form of an annular ring mounted on the front end of the body portion 26 and encircling the enlarged portion 29 of the head may be provided to prevent the entrance of foreign matter into the body.

The assembly of the gear 20 on the base 10 is such as to locate the gear within the bore 27 for engagement by a gear 32 pinned, as at 33, to the shaft 28 adjacent to the inner face of the bearing enlargement 30. The gears 20 and 32 are in this instance bevel gears having a 1 to 1 gear ratio whereby when the body 11 is rotated about a vertical axis the tool head will be driven a comparable angular distance about a horizontal axis.

Bearing means for the opposite or rear end of the shaft 28 is afforded in this instance by a sleeve 34 seated in the bore. Such means as a key or pin 35 permits the sleeve to have axial but non-rotative movement relative to the body. The outer end face of the sleeve 34 is recessed, as at 36, to provide a base surface for engagement by the end face of a projection 37 on the nut 38 screw-threadedly engaging the end portion of the shaft 28. The nut 38 is held against removal from the shaft by a lock nut 39 which may in turn be fixed as by a set screw 40 to the end of the shaft 28.

Rotation of the nut 38 on the shaft 28 in one direction will produce an inward axial movement of the sleeve 34 which movement is employed to secure the body 11 and head 12 rigidly to the base 10 in any of the relative angular positions of the body and head. Thus the inner end face of the sleeve 34 has an axial recess 41 therein to receive the gear 20 and the end face of the sleeve is provided with an arcuate cut-out 42 having an end face complemental to one side of a flaring face 43 on the gear hub 21. A spring 44 encircling the shaft 28 and bearing between the opposed faces of the gear 32 and the sleeve 34 urges the sleeve in the opposite direction to a retracted, unlocked position when the nut 38 is reversely rotated.

As may best be seen in Fig. 3 the skirt of the body on opposite sides thereof carries sets of indicia 45, 46 graduated in this instance in degrees of rotation for right and left hand movement respectively. These indicia are respectively coordinated with zero reference points 47, 48 which indicate original predetermined relationships between the parts. The location of the indicia or scales 45, 46 on the top face of the more or less horizontally extending skirt of the body member makes them readily visible to an operator standing in front of the machine and looking down at the carriage on which the fixture is located.

Figure 2:
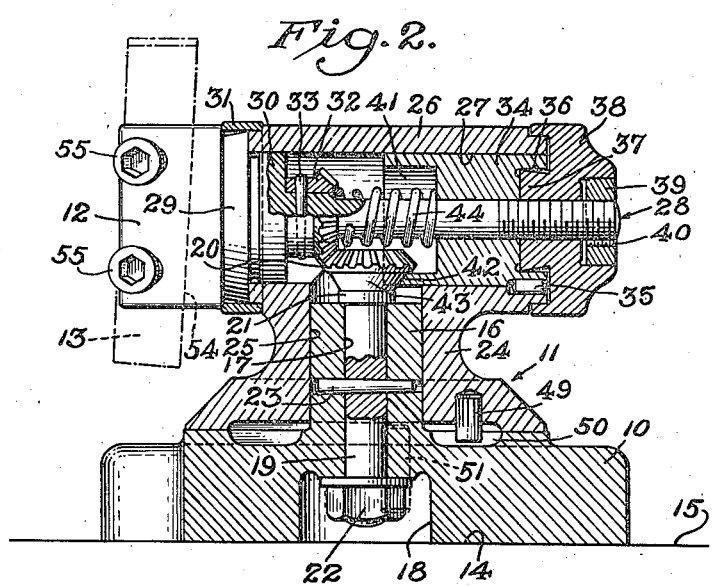
Fig. 2 is a vertical sectional view through the tool taken along the line 2—2 of Fig. 3.

Preferably the relative movement of the body to the base is limited by stop means such as that shown in Figs. 2 and 3 which comprises a pin 49 carried by the body to extend downwardly into the groove 50 provided between the meeting faces of the base and body for engagement with the upwardly extending ends of other pins 51 mounted in spaced relation on the base.

The exemplary tool bit 13 shown herein is of a type which comprises an elongated body of rectangular or square cross section (Figs. 1 and 2) having a cutting edge 52 along one end edge, relieved by a groove 53 of generally angular cross section, the root of which extends diagonally of the end face of the tool bit from the high corner of the cutting edge. The groove is of increasing depth, and the root angle is approximately 90°.

The end face of the tool bit is developed so that its plane slopes away in all directions from one high corner of the end of the bit, such high corner being located at one end of the cutting edge 52. Side clearance for the cutting edge is thus afforded by the slope of the plane of the end face away from the cutting edge 52, and the cutting edge itself is moreover sloped at somewhat less than a right angle with reference to the bit axis. The otherwise planar face of the bit, sloped as just set forth, is traversed by a groove 53 which relieves the cutting edge 52 for chip clearance has an angularity to the cutting edge and to the plane of the end face that is variable depending on the metal to be cut by the bit. It is this angularity that differs most frequently in tool bits of this character, the other angular relationships usually having a predetermined fixed value. In discussing the relationship of the tool bit to the fixture and the use of the device it will be presumed that a resharpening operation is to be performed.

To so support the tool bit as to obtain the several angular relationships quickly and accurately, the head 12 is provided with a transverse slot 54 in its front face which is arranged to support the bit on a radial, and in this instance a vertical plane (as shown in Fig. 3) when the body 11 is centered on the base between the right and left hand zero reference points 47, 48. The tool bit is secured in the slot by set screws 55 or the like which enter the slot angularly from one side to seat the bit firmly against the base and opposite side of the slot with the cutting edge of the bit paralleling the side walls of the slot. The base of the slot is at an angle to support the tool bit with its axis on a radial plane but at an angle to a line normal to the axis of rotation of the tool bit head. This is a fixed angular relationship predetermined to produce a required angularity indicated at A in Fig. 6 of the cutting edge 52 to a plane perpendicular to the bit axis.

The other angular end face relationship (i. e., the slope of the plane of the end face away from the cutting edge 52) is usually the same in all sharpening of tools of the class indicated but will vary as to direction depending on whether a right hand or a left hand cutting edge is to be provided on the tool bit. Herein the sharpening of a bit with a right hand cutting edge, or so-called right hand bit, will be described with the understanding that the same procedure applies to a left hand bit except that the cutting edge will be located on the opposite side of the tool bit and the slot 53 correspondingly reversed in position the left hand set of rotation indicia being employed in manipulating the fixture. It will be seen in Fig. 3 that the zero point of the right hand set of indicia 45 is registrable with the zero reference point 47 on the base by rotational movement of the body 11 relative to the base in a clockwise direction from the central vertical position of the bit shown in Fig. 1. Through the geared connection 20, 32 such movement of the body about a vertical axis also rotates the head 12 about a horizontal axis to swing the bit to a position which is at a slight angle to the vertical axial plane of rotation of the tool head. In this instance this plane is perpendicular to what may be termed a plane of fixed reference and which may conveniently be determined as being the plane of the upper surface of the carriage 15 or more particularly the tangential plane which is parallel thereto of the grinding wheel 56 (Fig. 6) at the line of cutting engagement of the wheel with the work.

The relief angle of the plane of the end face of the bit back of the cutting edge (as indicated at B in Fig. 5) is determined by this setting. Thus for any tool bit having predetermined angularities A and B of the plane face behind the cutting edge the fixture is adapted to support the tool bit in position for an end face restoring operation in which position the plane of the end face is parallel with the plane of fixed reference. This, as has been explained, is the result of the operator simply securing the tool bit in the slot 50 of the head and setting the body at the proper point as determined by the correlation of the indicating marks 45, 47.

The body is locked to the base in this inclined position by turning the nut 38, the device is suitably secured to the carriage by such means as a magnetic chuck and the carriage and grinding wheel are moved relatively in the usual manner to grind the end face of the tool bit the few thousandths of an inch required to restore the end surface to its original condition. The relationship of the parts during this operation is shown in Figs. 4, 5 and 6. In this grinding operation it will be noted that the cutting edge is developed along a line which is parallel with the horizontal axis of tool head rotation and with the fixed plane of reference heretofore mentioned.

It will be understood that during the first grinding step described above it is immaterial where the fixture be located on the carriage of the grinding machine. That is for the reason that a horizontal surface is being ground on the tool bit across the entire end face of the latter and consequently any displacement of the fixture about its own vertical axis will not alter in any way the shape or location of the contour ground on the tool bit.

The next or second grinding operation restores the groove 53 to its original form. The other angles being constant, the angularity of the groove surface adjacent to the cutting edge to the plane of the end face (as indicated at C in Fig. 5) is ordinarily varied by an amount depending on the material to be cut. For any given angularity the tool bit is positioned for a groove grinding operation by rotating the body relative to the base, thus swinging or shifting the end face of the tool bit along a line which is the resultant of its movements about vertical and horizontal axes. It will be noted that in such movement the cutting edge will be maintained in its parallelism to the fixed reference plane. Accordingly, the sets of indicia 45, 46 may be calibrated to designate directly the rotational relationship between the base and body which will carry or shift the tool bit to dispose the groove surface which relieves the cutting edge on a plane parallel to the fixed reference plane and at the required angularity C to the end face of the tool bit.

Provision is also made for determining the angle at which the root of the groove 53 slopes outward away from the cutting edge 52. For that purpose the right and left hand sides of the base are provided with finished raised surfaces 57 perpendicular to the lower base face 14. These side surfaces are adapted for positioning engagement with a fixed part of the carriage, such as a back rail 58, paralleling the direction of relative movement of the grinding wheel and carriage. With the appropriate one of the faces 57 abutted against such a rail (see Fig. 7) the angle of divergence between the cutting edge 52 and the root of the groove 53 will be equal to the angle of such side face with reference to the longitudinal axis of the fixture base when, but only when, the tool bit holder 12 is adjusted into the position of Fig. 1 with the tool bit in a vertical plane. Actually the groove is never ground with the bit in such position since it must be cocked right or left, as the case may be, the achieve the desired angle for the relieving face of the groove as heretofore noted. And as an incident to any such lateral tilt of the tool bit it is, in the present fixture, also rotated a proportional distance about the vertical axis of the fixture body 11. The latter movement modifies the angle of the groove root with reference to the cutting edge 52 but such modification always bears a fixed proportionality to the selected angle for the relieving face of the groove. Consequently, even though the root angle does change with every change in relief angle, the root angle is always the same for any given relief angle so that a selected contour can be duplicated with precision, time after time, on successive tools.

Figure 7:
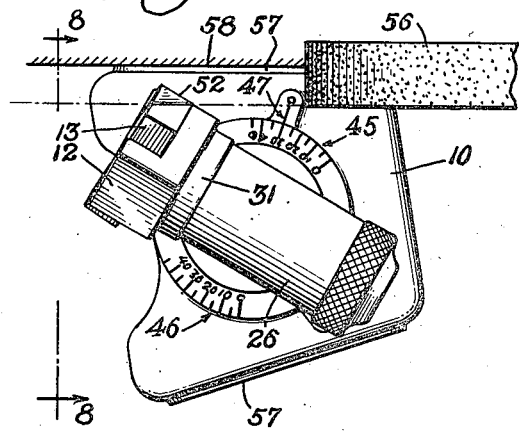
Figs. 7, 8 and 9 show in similar fashion the relation between the grinding wheel and a tool bit supported in an angular position for grinding the chip groove.
Figure 8:
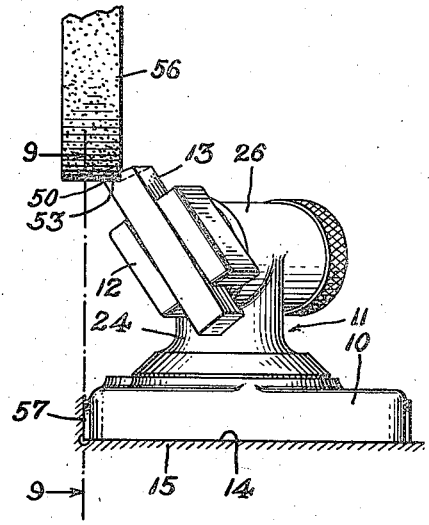
Figure 9:
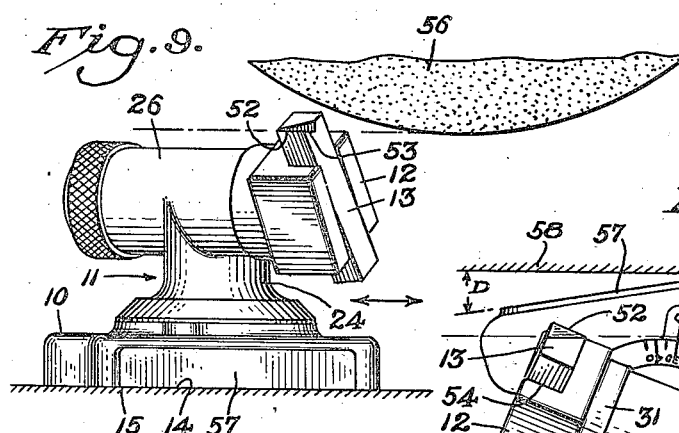

Having adjusted the fixture for the grooving operation as described, the grinding wheel 56 is shifted laterally until it only partially overlies the end of the tool bit, overhanging the side on which the cutting edge 52 is located (Fig. 8) and with the plane of the inboard side face of the wheel (right hand wheel face as viewed in Fig. 8) precisely intersecting the corner of the bit toward which the bit is cocked, that being the corner at which the groove 53 runs out of the face (see Figs. 7 and 9). The carriage is then stroked back and forth with reference to the wheel and with incremental downward feed of the wheel to cut the groove to a desired depth.

In comparing the second grinding operation with the first one it is to be noted that location of the fixture on the carriage, and hence with reference to the grinding wheel, must be predetermined or fixed. This is for the reason that in cutting the groove the grinding is not carried out over the entire end face of the tool bit, as was the case in the first grinding operation described, and consequently accurate location of the tool fixture is a condition precedent to proper location of the groove root with reference to the cutting edge on the tool bit.

Figure 10:
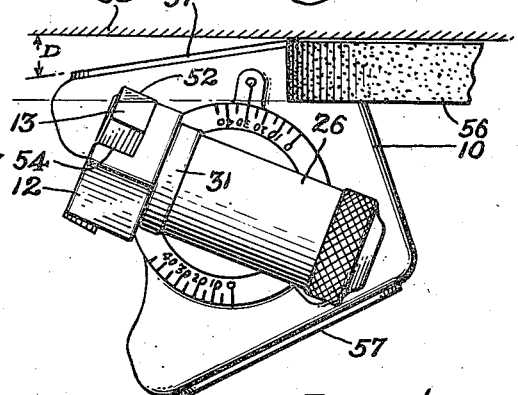

It will be evident that a tool bit having a known angularity of slope of groove may be quickly and accurately disposed in the position in which a few passes of the grinding wheel will restore the original groove form. Although the present invention has been described in connection with its utility in resharpening tools, it may be employed if desired in making the original tool bit. It is to be noted that certain of the angular values that are fixed according to the characteristics of the type of bit which will most frequently be used with the device may be varied if the operator so desires. Thus the operator may change the angularity of the plane of the end face from its fixed value by appropriate location of the zero point on the right or left hand sets of indicia 45, 46 out of registry with the reference points 47, 48 and the slope of the groove may be changed by locating the side faces 57 in a desired angular relation D to the back rail 58 as shown in Fig. 10.

I claim as my invention:

1. In a fixture of the type described, the combination of a generally flat base adapted to be rested on a grinding machine carriage or the like, a body member rising from said base and swiveled thereon to turn about a vertical axis, said body member having a laterally projecting skirt rigid therewith at its lower end and overlying said base, a tool head journaled on the upper portion of said head for angular adjustment about a horizontal axis, said tool head being slotted transversely to receive a tool bit with the latter intersecting said horizontal axis and canted at an acute angle with reference to a plane normal to said horizontal axis, whereby angular adjustment of said tool head about said horizontal axis from a position of zero angular adjustment in which the tool bit is upright serves to tilt such bit laterally, means for turning said body member about said vertical axis in unison with rotational adjustment of said tool head about said horizontal axis, said base having a laterally facing flat locating surface thereon disposed at an acute angle to the vertical plane in which said longitudinal axis lies when said tool head is in said position of zero angular adjustment, and indicia on said skirt coacting with indicia on said base to indicate the position of angular adjustment of said tool head.

2. In a fixture of the type described, the combination of a generally flat base adapted to be rested on a grinding machine carriage or the like, a T-shaped body member swiveled on said base for rotational adjustment about a vertical axis coaxial with the stem of the T, a tool head journaled on the outer end of one arm of the T and a locking nut rotatably mounted on the outer end of the other such arm, said tool head being adjustably rotatable about a horizontal axis and being slotted transversely to receive a tool bit with the latter intersecting said horizontal axis and canted at an acute angle with reference to a plane normal to said horizontal axis, whereby angular adjustment of said tool head about said horizontal axis from a position of zero angular adjustment in which the tool bit is upright serves to tilt such bit laterally, means operable by said locking nut for locking said tool head in selected positions of angular adjustment for the latter, means for turning said body member about said vertical axis in unison with rotational adjustment of said tool head about said horizontal axis, said base and body member having coacting indicia thereon for indicating the position of angular adjustment of said tool head, and said base having two generally oppositely facing flat locating surfaces on respective opposite sides thereof with each disposed at an acute angle to a vertical plane in which said horizontal axis lies when said tool head is in a position of zero angular adjustment, the angularity between each of said locating surfaces and said vertical plane being equal.

VICTOR W. GIDEON.